United States Patent
Sudo (10) Patent No.: US 10,699,257 B2
(45) Date of Patent: Jun. 30, 2020

(54) SYSTEM FOR IMPLEMENTING ITEM PAYMENT METHOD, PROGRAM PROVISION METHOD, AND MOBILE PHONE CONTROL METHOD

(71) Applicant: Latido Co., Ltd., Osaka-shi (JP)

(72) Inventor: Yoshihiro Sudo, Osaka (JP)

(73) Assignee: LATIDO CO., LTD., Osaka-Shi (JP)

(*) Notice: Subject to any disclaimer, the term of this patent is extended or adjusted under 35 U.S.C. 154(b) by 69 days.

(21) Appl. No.: 15/570,812

(22) PCT Filed: Sep. 12, 2016

(86) PCT No.: PCT/JP2016/076873
§ 371 (c)(1),
(2) Date: Oct. 31, 2017

(87) PCT Pub. No.: WO2018/037576
PCT Pub. Date: Mar. 1, 2018

(65) Prior Publication Data
US 2018/0349870 A1    Dec. 6, 2018

(30) Foreign Application Priority Data
Aug. 24, 2016 (JP) ................................. 2016-177105

(51) Int. Cl.
*G06Q 20/12* (2012.01)
*G06Q 20/32* (2012.01)
(Continued)

(52) U.S. Cl.
CPC ......... *G06Q 20/123* (2013.01); *A63F 13/792* (2014.09); *G06Q 20/12* (2013.01);
(Continued)

(58) Field of Classification Search
None
See application file for complete search history.

(56) References Cited

U.S. PATENT DOCUMENTS 5,745,556 A * 4/1998 Ronen .................... G06Q 20/12
                                                           379/114.01
5,799,285 A * 8/1998 Klingman .............. G06Q 20/00
                                                           379/93.12
(Continued)

FOREIGN PATENT DOCUMENTS

| JP | 2001-344471 | 12/2001 |
| JP | 2001-351022 | 12/2001 |
| JP | 2001-351169 | 12/2001 |

OTHER PUBLICATIONS

Valcourt et al., "Investigating mobile payment: supporting technologies, methods, and use," IEEE International Conference on Wireless and Mobile Computing, Networking and Communications, 2005, pp. 29-36 vol. 4. Available at: https://ieeexplore.ieee.org/document/1512946 (Year: 2005).*

*Primary Examiner* — Sarah M Monfeldt
*Assistant Examiner* — Gregory Harper
(74) *Attorney, Agent, or Firm* — Lex IP Meister, PLLC (57) ABSTRACT

A novel item payment settlement system is configured such that during a purchasing processes for items of differing purchase charges performed through an application on a mobile phone, connections are made to phone numbers having different connection charges, so that purchase charges of the items can be paid in the form of mobile phone connection charges, and a method therefor. Data in which a different phone number is associated in advance with each of purchase prices is retrieved from a memory, and a user identification signal such as a mobile phone number or the like is sent by making a call to the outside, whereby it is possible for an outside party to identify from the incoming phone number an amount that is to be paid; and further, the user number that is to pay can be easily determined.

10 Claims, 8 Drawing Sheets

(51) Int. Cl.
 *G06Q 20/40* (2012.01)
 *A63F 13/792* (2014.01)
 *G06Q 20/16* (2012.01)

(52) U.S. Cl.
 CPC ........... *G06Q 20/16* (2013.01); *G06Q 20/322* (2013.01); *G06Q 20/3229* (2013.01); *G06Q 20/405* (2013.01)

(56) References Cited

U.S. PATENT DOCUMENTS

| | | | | |
|---|---|---|---|---|
| 2001/0001147 A1* | 5/2001 | Hutchison | ............... | G06Q 20/12 705/51 |
| 2002/0004785 A1* | 1/2002 | Schull | ................... | G03B 13/02 705/51 |
| 2004/0076403 A1* | 4/2004 | Mankovitz | ............. | H04N 5/765 386/238 |
| 2005/0165674 A1* | 7/2005 | Edwards | ................ | G06Q 20/04 705/39 |
| 2006/0200735 A1* | 9/2006 | Ormond | ................. | G06Q 20/18 715/234 |
| 2010/0017285 A1* | 1/2010 | Smith | .................... | G06Q 20/10 705/14.36 |
| 2010/0152893 A1* | 6/2010 | Fure | ....................... | G06Q 20/32 700/237 |
| 2010/0235276 A1* | 9/2010 | Smith | .................... | G06Q 20/04 705/40 |
| 2010/0287155 A1* | 11/2010 | Reisman | .................. | G06F 8/65 707/709 |
| 2010/0312382 A1* | 12/2010 | Ma | ....................... | G06O 20/123 700/236 |
| 2012/0130853 A1* | 5/2012 | Petri | .................. | G06Q 30/0609 705/26.35 |
| 2013/0031191 A1* | 1/2013 | Bott | ...................... | G06F 21/552 709/206 |
| 2013/0065555 A1* | 3/2013 | Baker | .................. | G06Q 20/105 455/410 |
| 2014/0279469 A1* | 9/2014 | Mendes | .................. | G06Q 20/32 705/41 |

\* cited by examiner

PURCHASE CONFIRMATION MESSAGE

FIG. 2 C

COMMUNICATION/PROCESS

FIG. 2 D

PAYMENT COMPLETION MESSAGE

| ICON | IN-APP USABLE CURRENCY COUNT | PAYMENT CHARGE | PHONE NUMBER |
|---|---|---|---|
| A | 1 | ¥100 | I |
| B | 6 | ¥500 | II |
| C | 12 | ¥900 | III |
| D | 30 | ¥2,100 | IV |
| E | 60 | ¥3,900 | V |
| F | 80 | ¥4,900 | VI |
| G | 175 | ¥9,900 | VII |

FIG. 4 B

DURING RESTRICTED MODE SETTING
(EX. DURING PARENTAL CONTROL SETTING)

| ICON | IN-APP USABLE CURRENCY COUNT | PAYMENT CHARGE | PHONE NUMBER | RESTRICTED NUMBER |
|---|---|---|---|---|
| A | 1 | ¥100 | I | 100 |
| B | 6 | ¥500 | II | 20 |
| C | 12 | ¥900 | III | 10 |
| D | 30 | ¥2,100 | IV | 5 |
| E | 60 | ¥3,900 | V | 2 |
| F | 80 | ¥4,900 | VI | 2 |
| G | 175 | ¥9,900 | VII | 1 |

SYSTEM FOR IMPLEMENTING ITEM PAYMENT METHOD, PROGRAM PROVISION METHOD, AND MOBILE PHONE CONTROL METHOD

CROSS REFERENCE TO RELATED APPLICATIONS

This application is a National Stage of PCT Application No. PCT/JP2016/076873 filed on Dec. 6, 2018, which and claims priority to and the benefit of Japanese Patent Application No. 2016-177105 filed on Aug. 24, 2016. The entire contents of the aforementioned applications are incorporated herein by reference.

TECHNICAL FIELD

The present invention relates to a payment method in a game executable by a mobile phone, by which an existing fee collection system of a mobile phone can be utilized to make payments within a game application (hereinafter "in-app payments"), on a mobile phone that includes a tablet terminal incorporating a SIM card with an assigned phone number; and to a game application program with which it is possible to implement the payment method.

BACKGROUND ART

In recent years, users of games that were played using game software on home gaming devices have now more and more come to enjoy games which are implemented using a mobile phone, such as a smart phone.

Meanwhile, game application programs (hereinafter "game apps") that are provided to mobile phones such as a smart phone can be downloaded from servers administered by communications carriers or from servers administered by major game software companies, and stored in a storage device in a mobile phone, so that by operating a touch panel or the like, the game user can run game apps stored in the storage device, and play games.

With conventional home gaming devices, game software is sold on CD-ROMs or game cartridges, but as noted earlier, it is possible to download, at no cost, most current game apps as described above that can be played on mobile phones, and for game users to play games for free.

However, game app developer companies need to recover their development costs, and therefore some game apps are provided with ways for inducing game users to pay money, such as by purchasing in-game redeemable tokens (such as currency or points that only be used in the game) which can be redeemed for various items used in the game.

Such payments may be made by purchasing a prepaid card and then manually entering into the mobile phone a code that is printed on the card, to link the code to the player's own in-game ID, or by using a QR camera of the mobile phone to recognize a QR code that is printed on the card, to link the code to the player's own ID without the need for a manual operation, thereby creating a deposited fund, and purchasing the in-game redeemable tokens (in-game currency or in-game points) within the range of the available deposited fund. It is then possible for the game user to perform an operation on the mobile phone to redeem the purchased in-game redeemable tokens for various items that can be of benefit to the game user (game player), such as advantages in advancing through the game or the like while playing a game in the game app. Once redeemed, a prescribed percentage of the price of the purchased item is paid out to the game app developer who provided the game app.

Additionally, other typical payment methods include payment by credit card, by carrier settlement in which settlement is made separately from the mobile phone company's connection fees, by gift card, or by PayPal (trademark).

The system disclosed, for example, in Patent Document 1 is a further known system for a player to debit gaming charges from a personal bank account by payment data sent via a host computer at the phone company, by connecting from a mobile phone.

It is noted that the aforementioned forms of payment are typically known as in-app payments. In cases in which items are purchased for use in the game, by arrangements involving paying for content, for services of various kinds, or for additional functions, and the like, from within an application software (application program) used on a mobile phone, including a smart phone, these in-app payments may also be referred to as item payments. Other examples of the definition of in-app payments of both consumable type and non-consumable type include the following.

(Consumable type) Packages of files that can be exported into new formats, game currencies, game hints, additional lives, acquisition of experience points (Non-consumable type) Upgrades to a pro edition, removal of ads, unlocking the complete version of the game, unlimited hints, additional characters, additional accessories, bonus game levels, city guide map. With the consumable types, it is not possible to migrate items to another device, but with the non-consumable types, it is possible to link to a user ID and migrate items to other devices.

PRIOR ART DOCUMENTS

Patent Document

Patent Document 1 JP-A 2001-351169

SUMMARY OF INVENTION

Technical Problem

While noting that, in the aforementioned Patent Document 1 as well, laborious advance preparation, such as preparatory purchase of a prepaid card, is needed, there are the following problems as well.

That is to say, there exists a stratum of users who do not own a credit card and therefore cannot make payments despite wanting to; and cards, including gift cards, which are classified as prepaid cards, may be difficult to purchase at the regional level. In developed countries, there is a large stratum of people who use credit cards, but in developing countries, this segment is quite small. Further, while in Japan it is possible to widely disseminate prepaid cards through the medium of convenience stores in order to widely disseminate prepaid cards, in developing countries, as with the aforementioned credit cards, due to the fact that convenience stores per se do not necessarily exist in all regions, it may not be easy for game users to make in-app payments.

To solve the aforementioned problem, in the case of the aforementioned Patent Document 1, it is proposed to have a central processing device calculate the usage charge for each game selection by using a usage charge calculation means, to then store the calculated usage charges, transmit the stored usage charges to a host computer at an outside phone company, and carry out the payment process from the user's account. The usage charges are determined by the number of karaoke songs.

The problem here is that for some time now in-app payments have not been proportional across the board to the number of purchases made, or to the amount of in-app currency purchased, and in order to give users who purchase in large amounts an advantage over users who purchase in small amounts, it is typical to sell at a lower per-unit price to users who purchase a large amount all at once, so problems that arise in this context must be considered.

In the case of Net shopping and the like as well, the problem that because there are different charges for each item, the situation cannot be addressed by deciding upon a usage charge based on the number of purchases of items, is encountered.

In the case of direct purchases of items such as weapons or potions, rather than purchases of in-app currency, it is customary for the purchased amount to differ according to the efficacy of the item within the game, and a problem with the aforementioned Patent Document 1 is that such situations are not envisioned.

Further, because usage charges are calculated by a process within the gaming device prior to transmitting the usage charge to a host computer at the phone company, another problem encountered is that even if the usage charge within the gaming device is in error, a third party such as the phone company will not be aware of the error, making it necessary to rely upon the game program of the gaming device as the settlement authority.

An object of the present invention is to provide a novel item payment system for solving the aforementioned problems encountered with the prior art, as well as a method for the same.

Means for Solving the Problems

In order to solve the aforementioned problems, the present invention provides a novel item payment settlement system which is configured such that during a purchasing processes for items of differing purchase charges performed through an application on a mobile phone, connections are made to phone numbers having different connection charges, so that purchase charges of the items can be paid in the form of mobile phone connection charges, and a method therefor.

Specifically, the present invention provides a system for implementing an item payment method, which has the following configuration, wherein the system comprises:

means configured to generate a screen on which are displayed a plurality of items of different purchase prices (item purchase screen display means);

means configured to generate a purchase confirmation screen in response to a selection input signal indicating selection of any of the plurality of items (purchase confirmation message display means);

means configured to, in response to having received a purchase confirmation input signal after displaying the purchase confirmation screen, retrieve a phone number corresponding to the selected item from a memory in which a different phone number is stored in association with each of purchase prices of the plurality of items, impose a user identification signal on the phone number, and prepare to place a call;

means configured to, in response to the retrieved phone number, automatically place a call to the phone number without displaying the number, and send the prepared user identification signal;

means configured to, when placing a call, generate and displays a screen indicating that the purchasing process is in progress (communication process means); and means configured to, in response to having received a purchasing process completion signal from the outside, generate and display a screen indicating a purchase completion (for example, "payment completion message display" below.)

According to the present invention, for example, data in which a different phone number is associated in advance with each of purchase prices is retrieved from a memory, and a user identification signal such as a mobile phone number or the like is sent by making a call to the outside, whereby it is possible for an outside party to identify from the incoming phone number an amount that is to be paid; and further, the user number that is to pay can be easily determined. It may be possible thereby to achieve successive payments by single calls for single items to prevent a user from purchasing a high amount.

The present invention can also provide a game program for implementing the aforementioned payment method.

That is to say, a program provision method for implementation by a computer, comprises: a game program which is downloaded from an outside server in a process which is under the control of a controller of a mobile phone equipped with display functionality; which is stored in a storage means within the phone; and which is capable of executing the following processes in cooperation with the controller, the game program having:

a function configured to generate a screen on which are displayed a plurality of items of different purchase prices;

a function configured to generate a purchase confirmation screen in response to a selection input signal indicating selection of any of the plurality of items;

a function configured to, in response to having received a purchase confirmation input signal after displaying the purchase confirmation screen, retrieve a phone number corresponding to the selected item from a memory in which a different phone number is stored in association with each of purchase prices of the plurality of items, impose a phone number of a caller side (user identification signal) on the phone number, and prepare to place a call;

a function configured to, in response to the retrieved phone number, automatically place a call to the phone number without displaying the number, and send the prepared user identification signal;

means configured to, when placing a call, generate and display a screen indicating that the purchasing process is in progress; and a function configured to, in response to having received a purchasing process completion signal from the outside, generate and display a screen indicating a purchase completion.

According to this invention, in cases of purchasing items or virtual currency in an in-app payment in a game, it is possible to pay for a user identification signal that identifies the user, such as a phone number of a mobile phone; since the usage charge to be paid is linked to a phone number, to easily process the payment also at the payment processor side without the need to distinguish among items; and further to make payments on an as-needed basis for each of individual item purchases by single calls for single item purchases, whereby, as compared with a scheme in the aforementioned Patent Document 1 in which payments are made all at once, problems such as unnecessary purchases, or difficulty to discover the mistake when an incorrect payment has been made, can be avoided.

Figure 4:
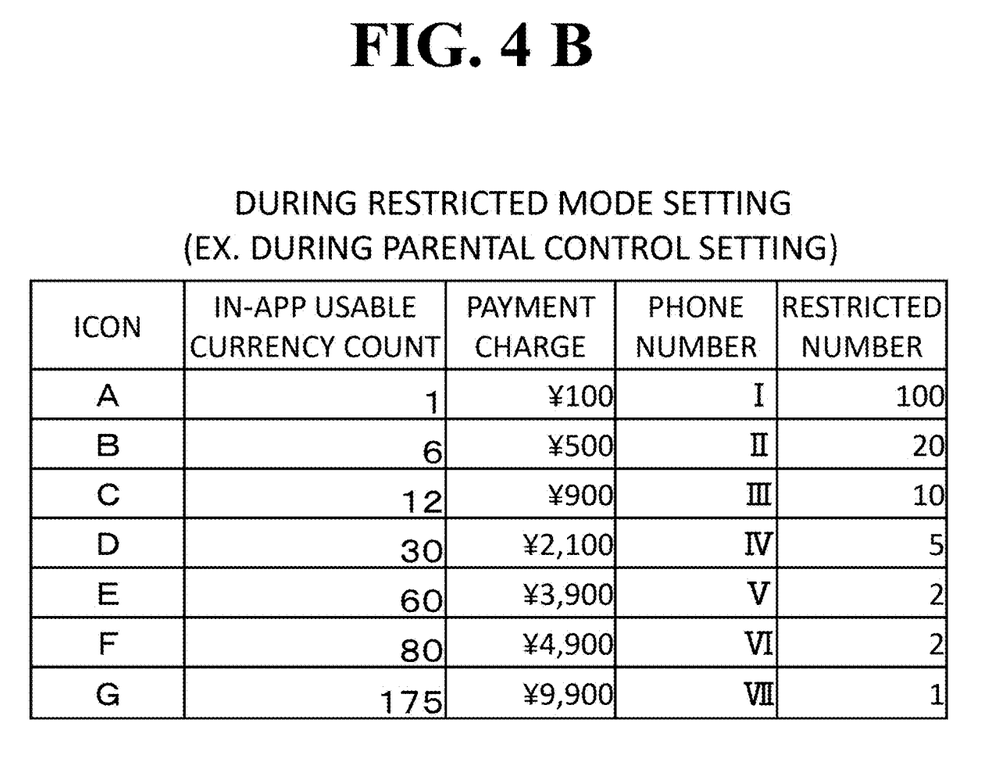
FIG. 4A illustrates a table having an unrestricted number of purchases.
FIG. 4B illustrates a table having a restricted number of purchases.

Further, as with parental control (FIG. 4B), it is possible to place in advance in a storage means 2 of a mobile phone 1 a number-of-purchases restriction for time-dependent management depending on the purchase charges for each of items A to G, and to impose restrictions as to the number of purchases made within a limited time period (for example, in one day) and easily manage unnecessary purchases. This is made possible by adopting a function of single calls for single item purchases.

Advantageous Effects of Invention

Payment and settlement in purchases of multiple types of items is accomplished through a simple method which involves calling a phone number. Moreover, successive payments and settlements by single calls for single items can be accomplished while displaying a purchase confirmation screen each time, reducing the risk of a high-amount request.

BRIEF DESCRIPTION OF THE DRAWINGS

FIG. 4A and FIG. 4B are diagrams illustrating table data that includes associations among item icons (A to G) which are displayed on an item purchase screen, purchased items (in-app useable currency count), payment charges which are the amounts to be paid to purchase the respective items, and phone numbers to communicate to an outside party for payment purposes.

DESCRIPTION OF THE EMBODIMENT

An embodiment to which the present invention is applied will be described below on the basis of FIGS. 1 to 4. According to the present invention, there will be described an example in which a game program is downloaded, the game program (the same as a game app) is executed, and in-app payments are executed, and the invention could of course also be applied to cases in which the phone numbers to which payment for each item is made are established such that the phone numbers differ according to different purchase charges for each item, and the items may be items that are purchasable by net shopping.

Figure 1:
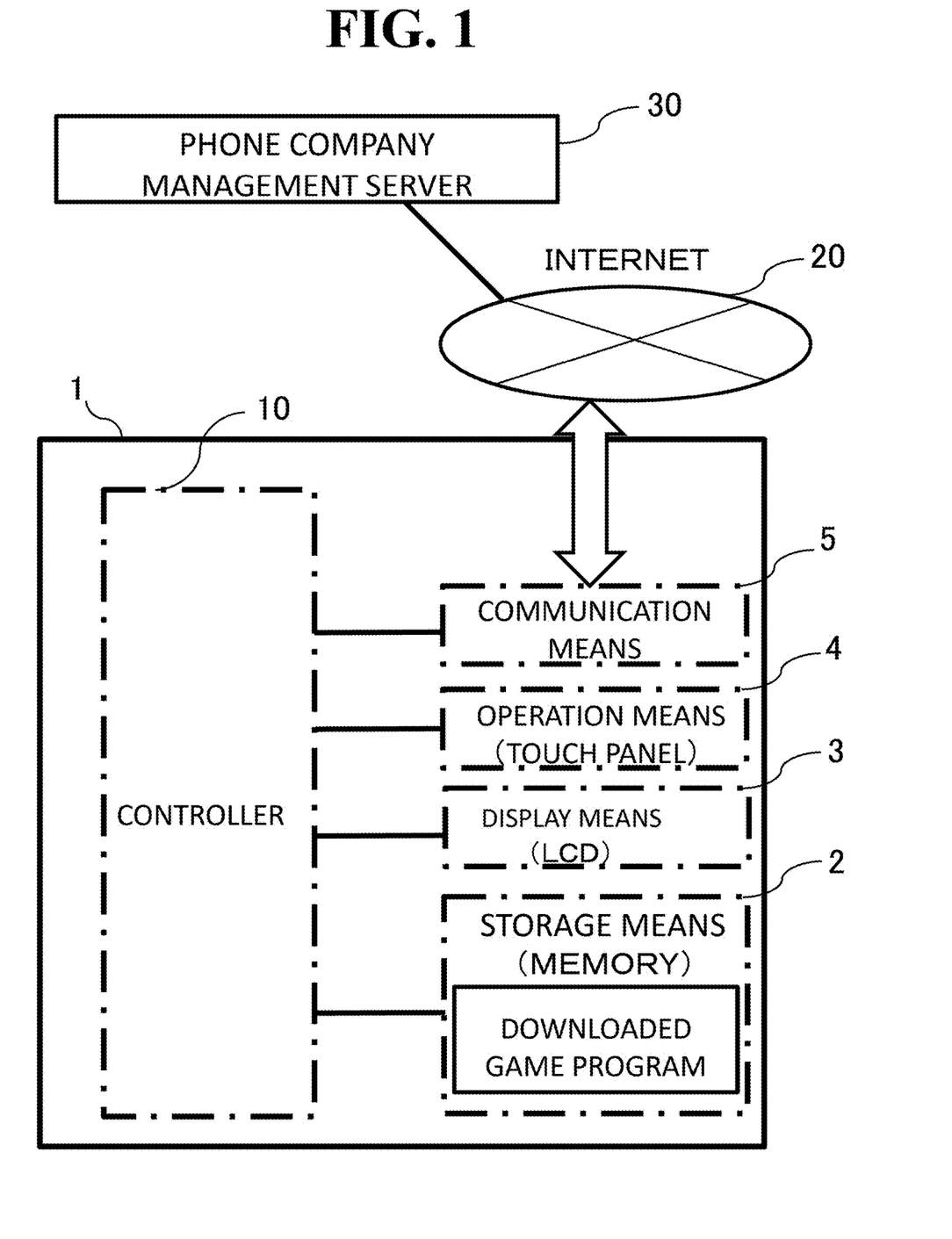
FIG. 1 is an explanatory diagram illustrating a connection relationship, via an internet circuit, between the hardware of a mobile phone and a phone company management server.

The diagram illustrated in FIG. 1 is an explanatory diagram illustrating a connection relationship, via an internet circuit, between the hardware of a mobile phone and a phone company management server.

Symbol 1 denotes a mobile phone such as a smart phone, the mobile phone 1 comprising: a storage means 2 for storing a downloaded program, such as any of various game applications, in which in-app payments are executable; a display means 3 for displaying screens to prompt a user who is using the in-app payment function to confirm a purchase; an operation means 4 enabling the user, while confirming the screen, to perform confirmation input in order to make a confirmation and generate a confirmation input signal, or for generating a selection input signal once the user has selected an item for purchase from among multiple types of items; and a communication means 5 which has a function for calling phone numbers that have been linked to multiple types of items having different purchase prices, and sending a user identification signal to a called party as a user identification number, and for receiving a purchasing process completion signal which is received in the event that payment to the calling phone number which is the received user identification number has been completed.

The storage means 2, the display means 3, the operation means 4, and the communication means 5 are each connected to a controller 10, and are housed together in a case in the mobile phone 1.

The phone numbers which are called from the communication means 5 are connected to a phone company server 30 via a communications circuit 20. On the basis of the phone number of the caller, the phone company management server 30 executes a payment process on the user of the calling phone number to pay the charge associated with the called phone number. The phone company management server 30 is designed so that a charge, which is predetermined for each individual called phone number, is paid by the user of the calling phone number. The phone company management server determines whether the state of communication vis-a-vis the called phone number is a state in which settlement by the mobile phone of the calling phone number user is possible, and thereafter sends a purchasing process completion signal to the caller, and then executes a process to disconnect the communication state.

Next, the item purchasing process will be described on the basis of FIG. 2A, FIG. 2B, FIG. 2C, FIG. 2D, and FIG. 3.

Figure 2:
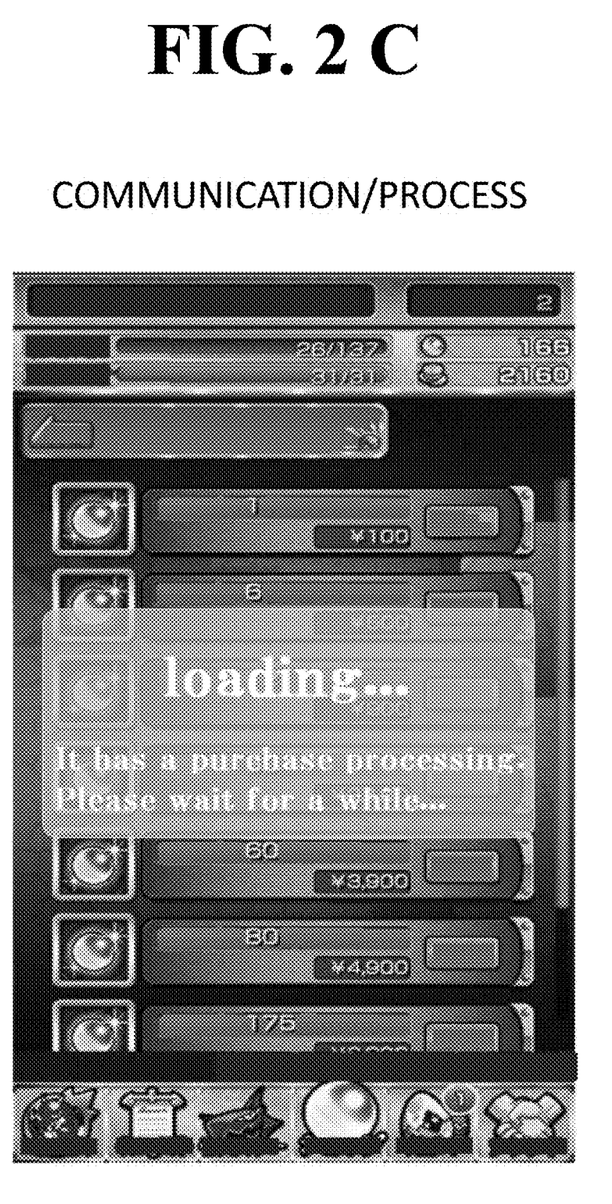
FIG. 2A to FIG. 2D show a flow chart of transitions among screens in selecting an item, FIG. 2A illustrating a state in which an item purchase screen is displayed, FIG. 2B illustrating a purchase confirmation message display state, FIG. 2C illustrating a state in which a communication and purchasing process is being executed, and FIG. 2D illustrating a payment completion message display state.
Figure 2A:
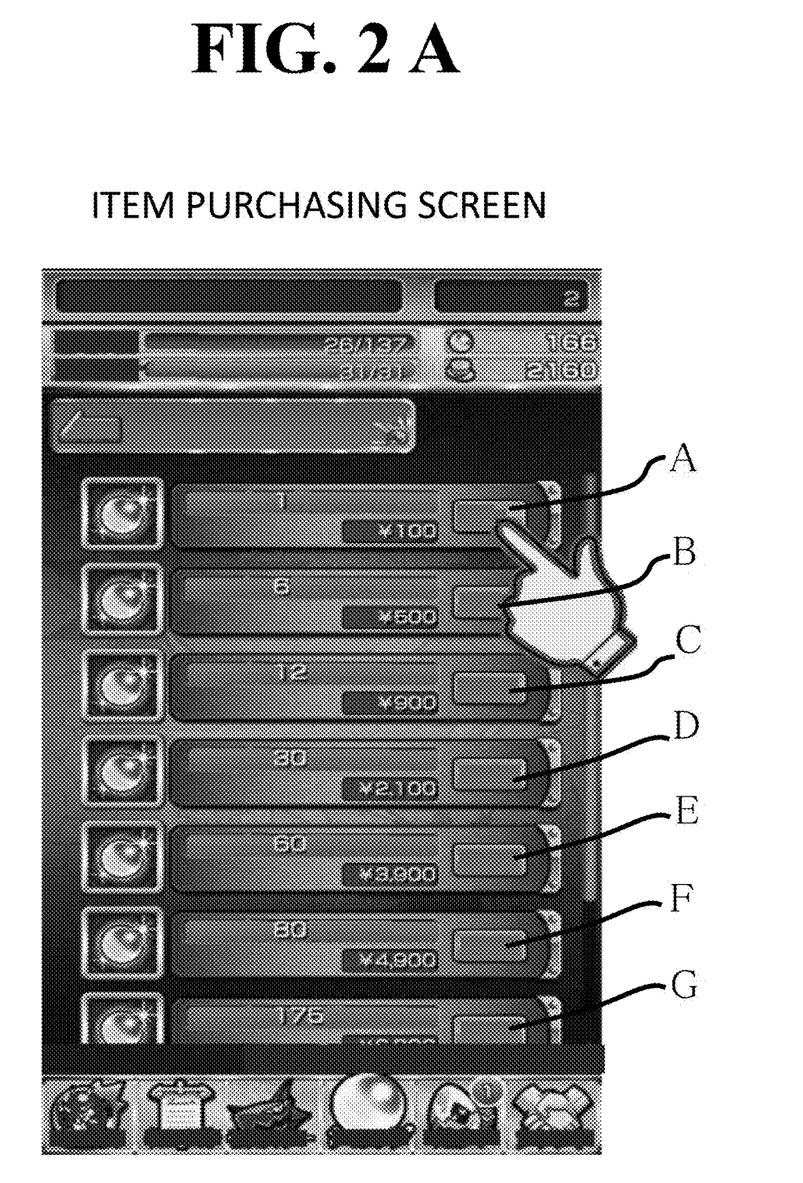

While not illustrated in the diagrams, when a user who is a game player uses the operation means 4 to execute an operation in order to display a purchase screen for purchasing currency for in-app use, termed a "virtual currency" which it is possible to use in the game, the controller 10 generates a purchase screen and displays the screen illustrated in FIG. 2A on the display means 3. In the case of this item purchase screen, under control by the controller 10, each specific number of orbs which represent a virtual currency to be purchased is display-processed as individual items (step S1). From this state illustrated in FIG. 2A, when an icon A is selected by operating the operation means 4 (step S2: YES), the controller 10, acting on the basis of the table data illustrated in FIG. 4A and stored in the storage means 2, uses the payment charge of the selected item (any one of icons A to G) and executes a purchase amount screen display process to generate a purchase confirmation screen which is a screen prompting the user for purchase confirmation (step S3). In the event that no item has been selected (step S2: YES), the item purchase screen continues to be displayed unchanged.

To repeat, FIG. 2 A corresponds to an in-app purchase screen. The normal payment flow involves opening a payment settlement flow, or a carrier settlement confirmation screen, by respectively transitioning from the app, to make a payment. Once settlement of "Item Price"="Connection Charge" has been made to select the purchase, communication is carried out and the displayed connection charge is generated. In the case that the icon A has been selected, the displayed connection charge is equivalent to "¥ 100" as displayed in FIG. 2B.

Figure 2B:
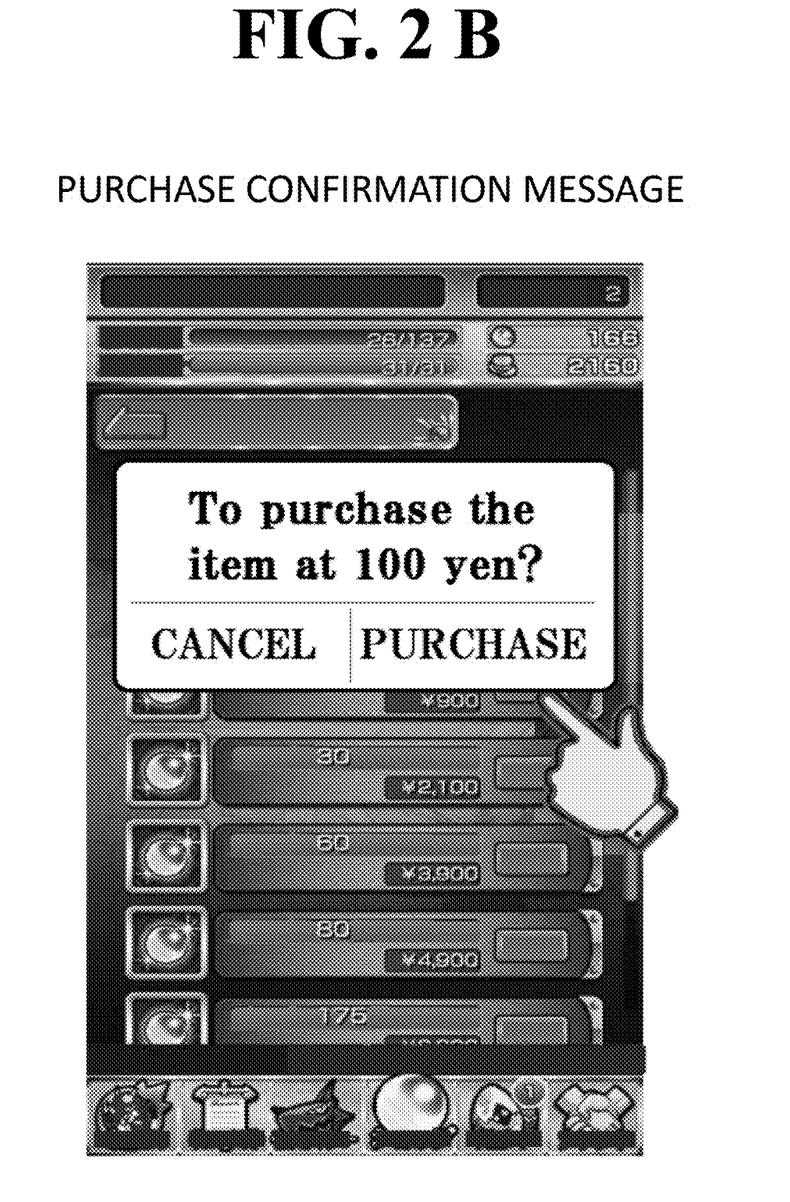
Figure 3:
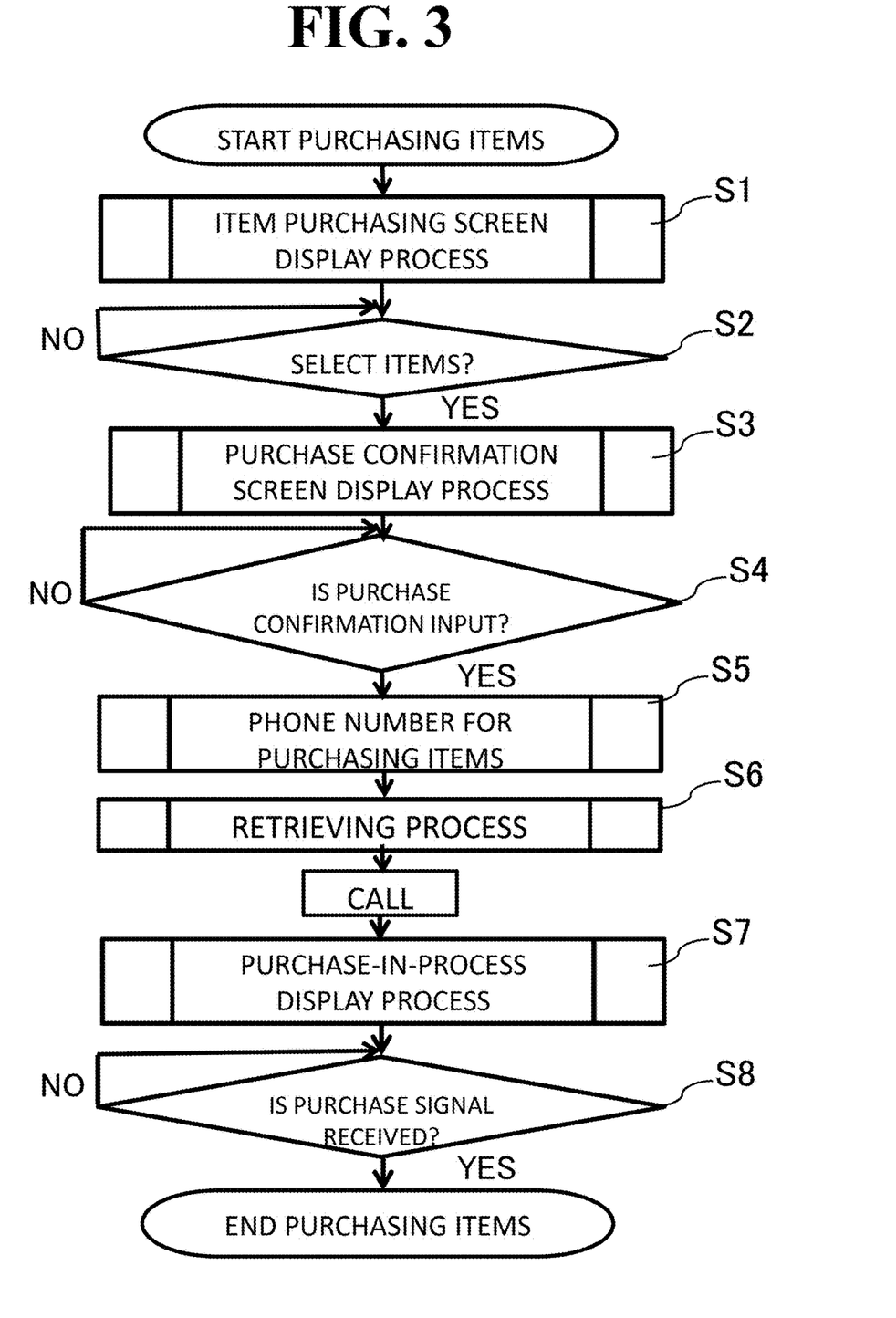
FIG. 3 illustrates an item purchase flow.

After generation of the purchase confirmation screen of step S3 by the controller 10 and display on the display means 3, the user uses the operation means 4 to perform a purchase confirmation input, and thereby generates a purchase confirmation input signal (generates a purchase confirmation input signal by touching "Purchase") in FIG. 2B). The controller 10 then determines that a purchase confirmation input has been made (step S4: YES). In the event of a determination that no purchase confirmation input has been made (step S4: NO), the controller 10 continues to display the purchase confirmation screen unchanged.

Figure 4A:
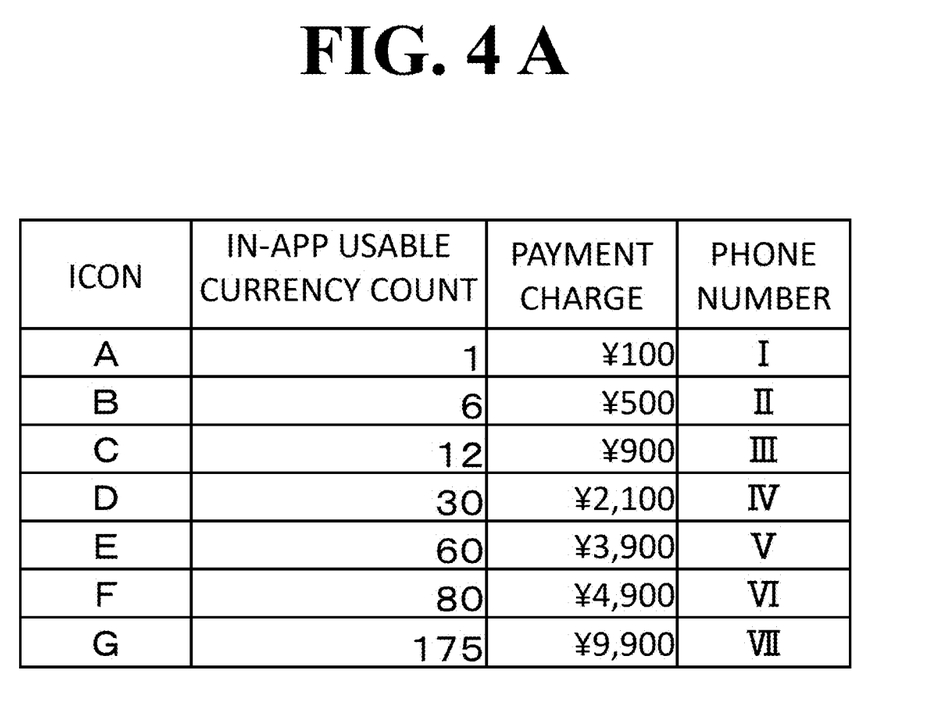

In the event of a determination of YES by the controller 10 in step S4, the controller 10 executes a process to retrieve the phone number that corresponds to the selected item, from among the different phone numbers associated with each purchase price of the plurality of items (step S5). A table in which a different phone number is associated with each of purchase prices of the plurality of items is illustrated in FIG. 4A. FIG. 4B illustrates a table when set to a previously prepared restricted mode in which the number of purchases made by a child is restricted, as would be done by a guardian.

Referring to FIG. 2A and FIG. 4A, in the case of the present embodiment, five types of items A to G have been prepared by way of purchasable items. The phone number that is linked to the item A as table data is drawing symbol I. In the stored table data, phone number II is linked to the item B, phone number III to the item C, phone number IV to the item D, phone number V to the item E, phone number VI to the item F, and phone number VII to the item G.

Next, in step S5, the controller 10 places a call to the phone number that is associated with the selected item A (step S6). Once the phone number is called, a call is placed to the phone company management server 30 through the communication circuit 20. Depending on the communication state after the call is placed, the controller 10 executes a process to send, to the phone company management server 30, an ID which is identifying information of the application (the game program stored in the storage means 2) in which the in-app payment was made, the ID of the item to be purchased, call placement time and date information, and a user identification signal (also called "user identifying information") which is the caller's phone number. The received application ID, the ID of the item to be purchased, the call placement time and date information, and the caller's phone number for each user identification are stored in a database in the server 30, so it is possible to subsequently check whether a mistaken order was placed. Meanwhile, a controller (not illustrated) of the phone company management server 30 executes a purchasing process to determine whether the user associated with the phone number of the calling mobile phone is a user who is late in payment, so that the phone number status is such that settlement cannot be made, or whether the item purchases do not exceed the restricted number in FIG. 4B. By way of a screen for display during this determination, the controller 10 executes a process to generate a display screen for "purchase in process" display, and prompts the display means 3 to display the screen (step S7). The screen displayed in this process of step S7 corresponds to the screen of FIG. 2C In the payment scheme of this embodiment, unlike conventionally, there is no need to input an ID and a password to identify an individual person when each purchase is made, thus eliminating a troublesome task and improving convenience, as well as making it possible to carry out input through a secure procedure in the application at the mobile phone 1 side. That is, instead of manual input of an ID and a password, the process can be accomplished by a program process of the application, without participation by the user.

However, in the event of a determination by the controller (not illustrated) of the phone company management server 30 that settlement may take place, a purchasing process completion signal is sent to the mobile phone 1 via the communication means 5. In the event of a determination that the controller 10 has received the purchasing process completion signal (step S8: YES), the controller 10 terminates the item purchasing process, in cooperation with the game program stored in the storage means 2 (step S8).

That is, according to FIG. 1, FIG. 2A, FIG. 2B, FIG. 2C, FIG. 2D, FIG. 3, FIG. 4A, and FIG. 4B, the controller functions as each of the following means, in cooperation with the game program which has been downloaded from outside and stored in the storage means 2.

The plurality of means includes: means configured to generate a screen on which are displayed a plurality of items of different purchase prices (item purchase screen display means); means configured to generate a purchase confirmation screen in response to a selection input signal indicating selection of any of the plurality of items (purchase confirmation message display means); means configured to, in response to having received a purchase confirmation input signal after displaying the purchase confirmation screen, retrieve a phone number corresponding to the selected item from the storage means 2 (memory) in which a different phone number is stored in association with each of purchase prices of the plurality of items, impose a user identification signal on the phone number, and prepare to place a call; means configured to, in response to the retrieved phone number, automatically place a call to the phone number without displaying the number, and send the prepared user identification signal; means configured to, when placing a call, generate and display a screen indicating that the purchasing process is in progress (communication process means); and means configured to, in response to having received a purchasing process completion signal from the outside, generate and display a screen indicating a purchase completion (for example, "payment completion message display" below.)

It is noted that, as stated above, according to the payment method of the present invention and a game program in which the payment method is adopted, the program adopts a function whereby a payment process is executed in single calls for single item purchases to be configured to easily restrict the number of calls so that restrictions as to the number of calls become increasingly strict for items of greater purchase price. That is, by setting the program to the restricted mode, and setting up the table illustrated in FIG. 4B, it is possible to set the number of purchases allowed to a smaller number for items of higher price, and prevent waste. Optionally, the program may be configured such that this number restriction is time-limited resets every day, or configured such that the number restrictions is reset to zero by a reset operation that is known only to a parent.

Examples of item purchase restrictions are given below. Restriction of item purchases is accomplished by restricting the number of times that the button for inputting items can be pressed at the mobile phone 1 application side, or the number of times that communication is received at the phone company management server 30 side. In so doing, settings can be made such that item purchases cannot exceed a given amount. As a result, restriction on the number of purchases to made by a child can be set by a guardian, for example.

Examples of methods for restricting the number by the phone company management server 30 in this event are given below. The phone company management server 30 receives from the caller's mobile phone 1 a phone number, a user identification signal, application identifying information, and purchase information that includes at least one piece of information identifying an item for purchase. Next, by counting the received purchase information and cumulating the count, the phone company management server 30 restricts the number of purchases of the plurality of items. In this case, the phone company management server 30 presets, for each user identification signal (ID), a number of times to which the user is restricted, performs a repeating process of determining whether the number of times counted has reached the preset number of times, and restricts the number of purchases of items.

INDUSTRIAL APPLICABILITY

This invention provides a payment method which is useful for commercial transactions that are conducted via a communication circuit, such as in-app payments, or net shopping, which is a form of e-commerce.

REFERENCE SIGNS LIST

1: Mobile phone
2: Storage means
3: Display means
4: Operation means
5: Communication means
10: Controller
20: Communications circuit
30: Phone company management server

What is claimed is:

1. A system for executing an item payment method in a game application of a mobile phone, comprising:
   a storage device; and
   a controller that:
   (A) generates a screen on which are displayed a plurality of items to be used in the game application, the plurality of items having different purchase prices, and the different purchase prices being different in a per-unit price;
   (B) generates a purchase confirmation screen in response to a selection input signal indicating selection of any of the plurality of items;
   (C) in response to having received a purchase confirmation input signal after displaying the purchase confirmation screen, retrieves a phone number corresponding to the selected item from the storage device in which a different phone number is stored in association with each of purchase prices of the plurality of items, imposes a user identification signal on the phone number, and prepares to place a call;
   (D) in response to the retrieved phone number, automatically places the call to the phone number without displaying the phone number, and sends the prepared user identification signal;
   (E) when placing the call, generates and displays a screen indicating that the purchasing process is in progress; and
   (F) in response to having received a purchasing process completion signal from the outside, generates and displays a screen indicating a purchase completion,
   wherein in the (C) and (D), a single iteration of the call placement process is executed for each of the item purchasing processes,
   wherein the storage device stores a table in which a restricted number of purchases, a phone number and a purchase price are set for each of the items having the different purchase prices, and
   wherein the restricted number set for the item having a first purchase price is less than the restricted number set for the item having a second purchase price being lower than the first purchase price.

2. The system according to claim 1, comprising:
   a mobile phone including the controller; and
   a phone company management server configured to connect to the mobile phone via a communications circuit, and on the basis of the phone number of the caller, execute a payment process on a user of the phone number of the caller to pay a connection charge that has been associated with the called phone number, wherein
   the mobile phone is configured such that connections are made, via the application, to phone numbers having different connection charges according to the purchase prices of items, and
   the phone company management server allows the user of the phone number of the caller to pay the purchase price of the item, in the form of a connection charge of the mobile phone, on the basis of the connected phone number.

3. The system according to claim 2, wherein the (A) to (F) are realized through downloading and execution, within the mobile phone which is a computer, of a program for use by the application, which is stored on an external server.

4. The system according to claim 2, wherein the phone company management server:
   receives, from the mobile phone of a caller, the phone number, the user identification signal, the application identifying information, and purchase information that includes at least one piece of information identifying an item for purchase; and
   counts the received purchase information and cumulating the count, to thereby restrict the number of purchases of the plurality of items.

5. A program provision method for implementation by a computer, comprising:
   downloading a game program for executing an item payment method in a game application of a mobile phone from an outside server in a process which is under the control of a controller of mobile phone equipped with display functionality; and
   storing in a storage device within the mobile phone, wherein
   the game program causes the controller to execute:
   (A) to generate a screen on which are displayed a plurality of items to be used in the game application, the plurality of items having different purchase prices, and the different purchase prices being different in a per-unit price;
   (B) to generate a purchase confirmation screen in response to a selection input signal indicating selection of any of the plurality of items;
   (C) to, in response to having received a purchase confirmation input signal after displaying the purchase confirmation screen, retrieve a phone number corresponding to the selected item from the storage device in which a different phone number is stored in association with each of purchase prices of the plurality of items, impose a user identification signal on the phone number, and prepare to place a call;

(D) to, in response to the retrieved phone number, automatically place the call to the phone number without displaying the phone number, and send the prepared user identification signal;

(E) to, when placing the call, generate and display a screen indicating that the purchasing process is in progress; and (F) to, in response to having received a purchasing process completion signal from the outside, generate and display a screen indicating a purchase completion, wherein in the (C) and (D), a single iteration of the call placement process is executed for each of the item purchasing processes, wherein the storage device stores a table in which a restricted number of purchases, a phone number and a purchase price are set for each of the items having the different purchase prices, and wherein the restricted number set for the item having a first purchase price is less than the restricted number set for the item having a second purchase price being lower than the first purchase price.

6. A method for controlling a mobile phone using an application, comprising:

(A) generating a screen on which are displayed a plurality of items to be used in the game application the plurality of items having different purchase prices, and the different purchase prices being different in a per-unit price;

(B) generating a purchase confirmation screen in response to a selection input signal indicating selection of any of the plurality of items;

(C) retrieving, in response to having received a purchase confirmation input signal after displaying the purchase confirmation screen, a phone number corresponding to the selected item from a storage device in which a different phone number is stored in association with each of purchase prices of the plurality of items, imposing a user identification signal on the phone number, and preparing to place a call;

(D) automatically placing the call to the phone number in response to the retrieved phone number, without displaying the phone number, and sending the prepared user identification signal;

(E) generating and displaying, when placing the call, a screen indicating that the purchasing process is in progress; and (F) generating and displaying a screen indicating a purchase completion in response to having received a purchasing process completion signal from the outside, wherein in the (C) and (D), a single iteration of the call placement process is executed for each of the item purchasing processes, wherein the storage device stores a table in which a restricted number of purchases, a phone number and a purchase price are set for each of the items having the different purchase prices, and wherein the restricted number set for the item having a first purchase price is less than the restricted number set for the item having a second purchase price being lower than the first purchase price.

7. The method for controlling a mobile phone according to claim 6, wherein in the mobile phone, by storing a downloaded program used for the application in a storage unit, and executing the program by the controller, a general-purpose computer functions as a specialized computer, and the mobile phone is configured such that the connections are made, via the application, to phone numbers having different connection charges according to the purchase prices of items.

8. The system according to claim 1, wherein the controller determines whether a number of times the selected item is purchased within a predetermined period exceeds the restricted number of purchases set for the selected item, and generates and displays the screen indicating that the purchasing process is in progress when the number of times the selected item is purchased within the predetermined period does not exceed the restricted number of purchases set for the selected item.

9. The program provision method according to claim 5, wherein (E) generating and displaying the screen comprises:

determining whether a number of times the selected item is purchased within a predetermined period exceeds the restricted number of purchases set for the selected item; and generating and displaying the screen indicating that the purchasing process is in progress when the number of times the selected item is purchased within the predetermined period does not exceed the restricted number of purchases set for the selected item.

10. The method for controlling a mobile phone according to claim 6, wherein (E) generating and displaying the screen comprises:

determining whether a number of times the selected item is purchased within a predetermined period exceeds the restricted number of purchases set for the selected item; and generating and displaying the screen indicating that the purchasing process is in progress when the number of times the selected item is purchased within the predetermined period does not exceed the restricted number of purchases set for the selected item.

* * * * *